United States Patent
Sundararaman et al.

(10) Patent No.: US 8,145,878 B2
(45) Date of Patent: Mar. 27, 2012

(54) ACCESSING CONTROL AND STATUS REGISTER (CSR)

(75) Inventors: Ramacharan Sundararaman, Hillsboro, OR (US); Faisal Azeem, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 11/958,225

(22) Filed: Dec. 17, 2007

(65) Prior Publication Data

US 2009/0158001 A1  Jun. 18, 2009

(51) Int. Cl.
*G06F 13/368* (2006.01)
*G06F 12/10* (2006.01)

(52) U.S. Cl. ............ 711/221; 711/202; 711/E12.066
(58) Field of Classification Search .......... 711/221, 711/202, E12.019, E12.066
See application file for complete search history.

(56) References Cited

U.S. PATENT DOCUMENTS

| | | | |
|---|---|---|---|
| 5,592,625 A * | 1/1997 | Sandberg | 711/147 |
| 6,289,430 B1 * | 9/2001 | Broberg et al. | 711/203 |
| 6,986,015 B2 * | 1/2006 | Testardi | 711/202 |
| 2002/0073296 A1 * | 6/2002 | Buch et al. | 711/202 |
| 2002/0141401 A1 * | 10/2002 | Albert et al. | 370/389 |
| 2003/0182482 A1 * | 9/2003 | Creta et al. | 710/104 |
| 2005/0080941 A1 * | 4/2005 | Moll et al. | 710/15 |
| 2005/0188064 A1 * | 8/2005 | Schoinas | 709/221 |
| 2007/0168636 A1 * | 7/2007 | Hummel et al. | 711/202 |

* cited by examiner

*Primary Examiner* — Edward Dudek, Jr.
*Assistant Examiner* — Hal Schnee
(74) *Attorney, Agent, or Firm* — Trop, Pruner & Hu, P.C.

(57) ABSTRACT

A system may comprise one or more source agents, target agents, and a plurality of directory agents, which may determine the target agent to which one or more transactions generated by the source agents is to be sent. A controller may identify one of a plurality of directory agents to process the transactions. The directory agent may determine the control and status registers of the target agents to which the transaction is to be sent. The target agent may complete the transaction after receiving the transaction from the directory agent. The directory agents may store a memory map to resolve the target agent to which the transactions is to be sent. The directory based distributed CSR access may provide scalability to ever increasing number of heterogeneous agents in the system.

22 Claims, 3 Drawing Sheets

ACCESSING CONTROL AND STATUS REGISTER (CSR)

BACKGROUND

A computing environment may comprise one or more heterogeneous agents (HA) such as processors, network interface devices, I/O devices, and such other devices. The heterogeneous agents may comprise one or more control and status register (CSR). For example, the processor may control a peripheral device by programming one or more CSRs of the peripheral device. The central CSR access mechanism may present less design flexibility as such an approach would require all CSR end-points to meet the same latency. Also, the central CSR access mechanism may provide only limited bandwidth for the transactions between any heterogeneous agents.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a directory based distributed control and status register access mechanism employed in one or more heterogeneous agents such as a microprocessor and an I/O device. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, and acoustical signals. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
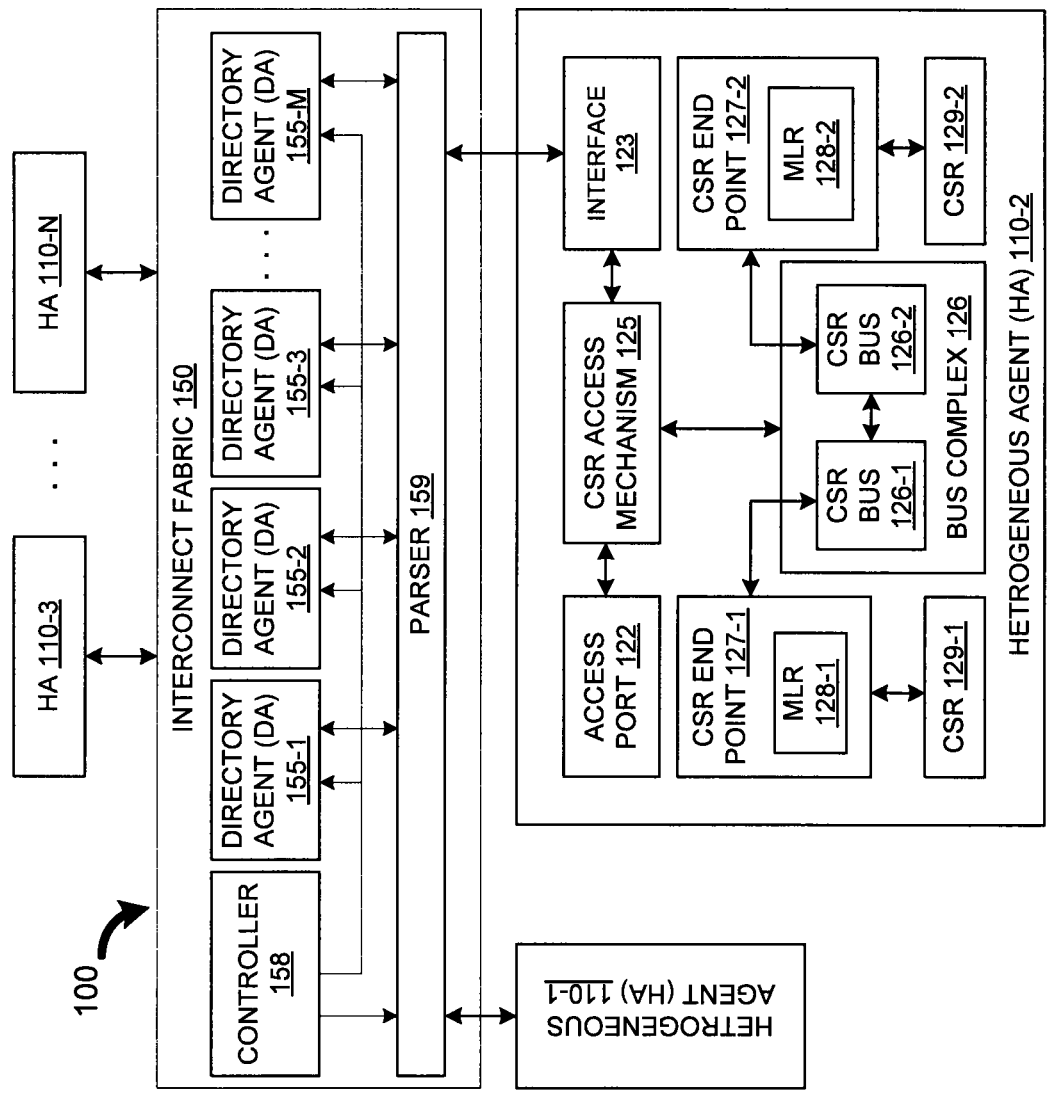
FIG. 1 illustrates a computing environment, including one or more heterogeneous agents, which supports a directory based distributed CSR access mechanism according to one embodiment.

A computing environment 100 including one or more heterogeneous agents, which may support distributed directory based CSR access mechanism in accordance with one embodiment is illustrated in FIG. 1. In one embodiment, the computing environment 100 may comprise heterogeneous agents 110-1 to 110-N and an interconnect 150.

In one embodiment, the interconnect fabric 150 may comprise directory agents 155-1 to 155-M, a controller 158, and a parser 159. In one embodiment, the directory agents 155-1 to 155-M along with the controller 158 and the parser 159 may provide directory based distributed CSR access mechanism. In one embodiment, the controller 158 may generate a memory map. In one embodiment, the memory map may indicate mapping of address ranges to identifiers of control and status registers (CSR) of the heterogeneous agents 110. In one embodiment, the controller 158 may store a copy of the memory map in each of the directory agents 155-1 to 155-M and the parser 159.

In one embodiment, the controller 158 may generate an address table comprising a list of association between the identifiers of the directory agents 155 and the address ranges of the memory map. In one embodiment, the controller 158 may store the address table comprising the association between the identifiers of the directory agents 155 and the address ranges of the memory map in the directory agents 155 and the parser 159. In other embodiment, the controller 158 may generate a target table and a source table comprising a fixed association between the directory agents 155 and the HAs 110. For example, the controller 158 may generate the target table comprising fixed association between the target agents HAs (e.g., 110-2, 110-3, and 110-N) and the directory agent (e.g., 155-1). In other embodiment, the controller 158 may generate the source table comprising fixed association between the source agents (e.g., 110-1, 110-L, and 110-K) and the directory agent (e.g., 155-1). In other embodiments, the controller 158 may determine the directory agent 155 to which the transactions are to be sent based on load balancing techniques.

In one embodiment, the parser 159 may store the address table comprising list of association between the identifiers of the directory agents 155 and the address ranges of the memory map. In other embodiment, the parser 159 may store the source table comprising a fixed association between the directory agents 155 and the HAs 110. In one embodiment, the parser 159 may receive the transactions and forward the transactions to an appropriate directory agent 155 based on the entries in the address table or the source table. For example, while the parser 159 is using the address table, if address bits field of a transaction A comprises an address, which is included in a first address range, the parser 159 may forward the transaction to the directory agent 155-1. In other embodiment, if the parser 159 is using the source table, which indicate a fixed association between the source agents (e.g., 110-A) and the directory agent (e.g., 155-1), the parser 159 may receive the transaction A from a source agent 110-1 and forward the transaction A to the directory agent 155-1.

In one embodiment, the directory agents 155-1 to 155-M may each store a complete memory map or a non-overlapping portion of the memory map. In one embodiment, the directory agent 155-1 may receive the transaction A and determine a target agent to which the transaction A is to be forwarded. In one embodiment, the transaction A may comprise address bits field, transaction type field, and CSR data field. In one embodiment, the directory agent 155-1 while using the address table may examine the address bits field of the transaction A to determine a target agent to which the transaction A is to be forwarded.

In one embodiment, the directory agent 155-1 may retrieve the address bits field of the transaction A and compare the address bits field with the address range field of the memory map to identify the matching address. In one embodiment, the directory agent 155-1 may further process the transaction A after determining the matching address. In one embodiment, the transaction A may be of memory mapped I/O (MMIO) access type.

In one embodiment, the memory map of the directory agent 155-1 may comprise a first address range (ADDR-A to ADDR-D) assigned to CSRs of the heterogeneous agent 110-1, a second address range (ADDR-E to ADDR-H) assigned to CSRs of the heterogeneous agent 110-2, and a third address range (ADDR-1 to ADDR-M) assigned to CSRs of the heterogeneous agent 110-3. In one embodiment, the directory agent 155-2 may comprise a fourth address range (ADDR-N to ADDR-Q) assigned to CSRs of HA 110-4, and the directory agent 155-M may comprise Nth address range (ADDR-W to ADDR-Z) assigned to CSRs of HA 110-N.

In one embodiment, the directory agent 155-1 may examine the address bits field of the transaction A, which may comprise ADDR-E and determine that HA 110-2 is the target agent to which the transaction A is to be sent. In one embodiment, ADDR-E may be an element of the second address range, which may correspond to the HA 110-2. In one embodiment, the ADDR-E may correspond to the CSR 129-1, which is provisioned in the heterogeneous agent 110-2. In one embodiment, the directory agent 155-1 may also receive, for example, transactions B, C, and D from other source agents such as the heterogeneous agents HA 110-E, 110-F, and 110-M. In one embodiment, the transactions B, C, and D may be directed to CSR 129-1 of the heterogeneous agent 110-2. In one embodiment, the directory agent 155-1 may serialize the transactions A, B, C, and D before sending the transactions A, B, C, and D to the heterogeneous agent 110-2.

In one embodiment, the heterogeneous agent 110-1 may represent a processor, which may generate the transaction A directed to the CSR 129-1 of the heterogeneous agent 110-2. In one embodiment, the heterogeneous agent 110-2 may represent an I/O device or another processor. In one embodiment, the heterogeneous agent 110-1 may send the transaction A to the interconnect fabric 150.

In other embodiment, the directory agent 155-1 while using the target table may receive the transaction A and forward the transaction A to a target agent, which is indicated by the target table. For example, the target table may associate the directory agent 155-1 to the target agent 110-2. As a result, the directory agent 155-1 may forward the transaction to the target agent 110-2.

In one embodiment, the heterogeneous agent 110-2 may comprise an access port 122, an interface 123, a CSR access mechanism 125, a bus complex 126, CSR end-points 127, and CSRs 129. In one embodiment, the access port 122 may be used by the CSR access mechanism 125 to send and receive transactions, which may not have to go through the interconnect 150. In one embodiment, the interface 123 may receive the transaction A from the directory agent 155-1 and translate the transaction A into a format acceptable by the CSR access mechanism 125. In one embodiment, the interface 123 may provide protocol translations for the out-going and in-coming transactions.

In one embodiment, the CSR access mechanism 125 may receive the transaction A and may identify the register address, which may equal the address of the CSR 129-1. In one embodiment, the CSR access mechanism 125 may retrieve the value stored in a transaction type field of the transaction A and may determine whether the transaction A refers to a Read or a Write transaction. In one embodiment, the CSR access mechanism 125 may cause the CSR bus end-point 127-1 to store the data in the CSR 129-1 if the value of the transaction type field indicates that the transaction A is a Write transaction. In one embodiment, the CSR access mechanism 125 may cause the CSR bus end-point 127-1 to retrieve or load the data from the CSR 129-1 to the CSR bus 126 if the value of the transaction type field indicates that the transaction A is a Read transaction. In one embodiment, the CSR access mechanism 125 may cause the CSR bus end-point 127-1 to send data to be written or receive data to be read over a bus complex 126. In other embodiment, the CSR access mechanism 125 may send a broadcast message indicating the arrival of the transaction A.

In one embodiment, the bus complex 126 may comprise one or more CSR busses such as a CSR bus 126-1 and a CSR bus 126-2. In one embodiment, the CSR bus 126-2 may interface with the CSR bus 129-2 through the CSR bus end-point 127-2. In one embodiment, the data sent from the CSR access mechanism 125 may be forwarded over the CSR bus 126-1 to the CSR bus end-point 127-1 as the destination CSR address is equal to the address of the CSR 129-1. Like-wise, the data retrieved from the CSR 129-1 may be received by the CSR access mechanism 125 over a path comprising the CSR bus end-point 127-1 and the CSR bus 126-1. In other embodiment, the CSR bus complex 126 may receive the broadcast message and then send the message to the CSR bus end-points 127.

In one embodiment, the CSR bus end-point 127-1, in addition to directly accessing the CSR 129-1 to perform Read and Write transactions, may comprise a master lock register (MLR) 128-1 to protect some private CSRs such as the CSR 129-1. In one embodiment, the CSR bus end-point 127-1 may be controlled by the CSR access mechanism 125. In one embodiment, the private CSR 129-1 may be accessed only by the trusted sources. In one embodiment, a trusted section of configuration software such as a trusted boot-loader may be allowed to access the CSR 129-1. In one embodiment, such trusted configuration software after accessing the private CSR 129-1 may lock further Read and Write transactions to the CSR 129-1. In one embodiment, hardware component may reset a lock-bit of the MLR 128-1 and the configuration software may configure the private CSR 129-1 following the reset by the hardware. In one embodiment, the configuration software may set the lock-bit of the MLR 128-1 after configuring the private CSR. In other embodiment, the CSR bus end-point 127-1 and 127-2 may receive the message comprising the data and may determine the CSR that need to be accessed.

Figure 2:
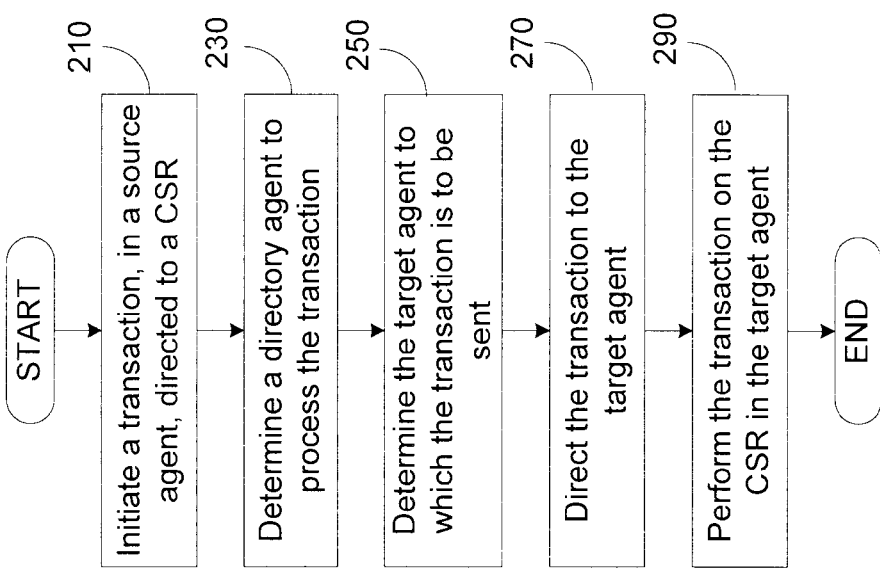
FIG. 2 is a flow-diagram illustrating a directory based distributed CSR access mechanism in one embodiment.

FIG. 2 illustrates an operation of the heterogeneous agents and the interconnect performing distributed directory based CSR access mechanism according to one embodiment.

In block 210, the source agent such as the HA 110-1 may initiate a transaction directed at a CSR in a target agent such as the HA 110-2. In one embodiment, the transaction may be a Read or a Write transaction.

In block 230, the controller 158 may determine the directory agent 155 to which a transaction generated by the HA 110-1 is to be sent. In one embodiment, the parser 159 may receive the transaction A and determine the directory agent 155 to which the transaction A is to be forwarded based on the address table or the source table stored in the parser 159.

In one embodiment, the parser 159 may store the address table comprising association between the address range of the memory map and the identifiers of the directory agents 155. In one embodiment, the parser 159 may compare the address bits field of the transaction A with the address range field of the memory map to determine a matching address. In one embodiment, the matching address may be associated with an identifier of the directory agent 155. In one embodiment, the parser 159 may forward the transaction A to the directory agent 155-1 as the identifier of the directory agent 155-1 may be associated with the matching address. In other embodiment, the parser 159 may forward the transaction A to the directory agent 155-1 based on the fixed association between the directory agent 155 and the HAs 110.

In block 250, the directory agent 155-1 may determine the target agent to which the transaction is to be sent. In one embodiment, the matching address of the address range may correspond to a CSR such as the CSR 129-1 of the HA 110-2. In one embodiment, the directory agent 155-1 may determine the target agent based on the memory map.

In block 270, the directory agent 155-1 may direct the transaction A to the target agent HA 110-2. In block 290, the CSR access mechanism 125, the CSR bus 126-1, and the CSR end-point 127-1 may provide a path over which the CSR 129-1 may either be written to or read from based on the type of transaction A.

Figure 3:
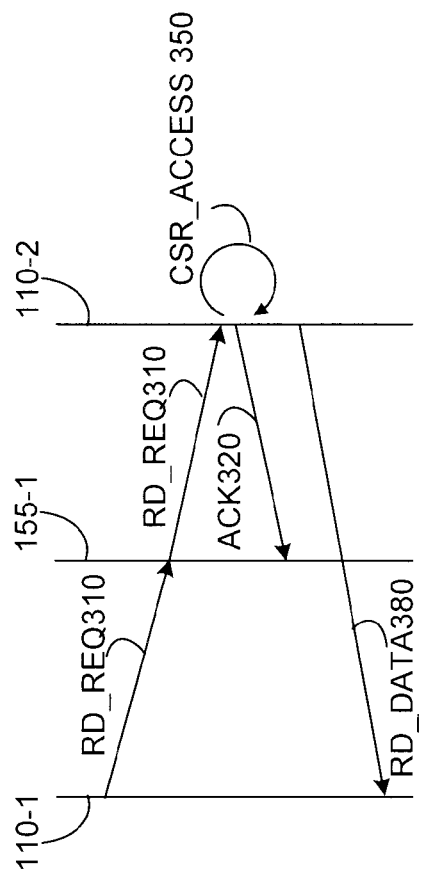
FIG. 3 illustrates a heterogeneous agent in which a Read operation is performed using directory based distributed CSR access mechanism according to one embodiment.

FIG. 3 illustrates a Read operation performed using distributed directory based CSR access mechanism according to one embodiment. In one embodiment, the HA 110-1 may send a transaction, which may represent a read request RD_REQ310. In one embodiment, the directory agent 155-1 may receive the read request RD_REQ310, identify the target agent 110-2, and send the read request RD_REQ310 to the target agent 110-2. In one embodiment, the target agent 110-2 may send an acknowledgement ACK 320 indicating that the data may follow. In one embodiment, the acknowledgement may be used to serialize the data. In one embodiment, the CSR access mechanism 125 may direct the CSR end point 127-1 to retrieve or load the data from the CSR 129-1 to the CSR bus 126-1 and retrieving the data from the CSR 129-1 is indicated by CSR_ACCESS 350. In one embodiment, the HA 110-2 may provide the retrieved data to the HA 110-1 and the transaction of providing the data is indicated by RD_DATA 380.

Figure 4:
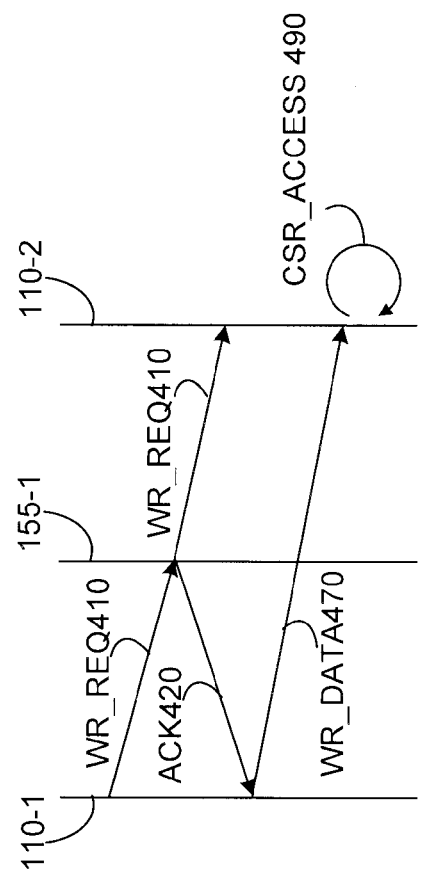
FIG. 4 illustrates a heterogeneous agent in which a Write operation is performed using directory based distributed CSR access mechanism according to one embodiment.

FIG. 4 illustrates a Write operation performed using distributed directory based CSR access mechanism according to one embodiment. In one embodiment, the HA 110-1 may generate a transaction, which may represent a Write request WR_REQ410. In one embodiment, the directory agent 155-1 may receive the Write request WR_REQ410, identify the target agent 110-2, and send an acknowledgement ACK 320 requesting the HA 110-1 to send data. In one embodiment, the directory agent 155-1 may then send the Write request WR_REQ410 to the target agent 110-2. In one embodiment, the HA 110-1 may send the data to be written to the CSR 129-1 and the transaction of sending the data to be written is indicated by WR_DATA470. In one embodiment, the CSR access mechanism 125 may cause the CSR bus end-point 127-1 to store the data to the CSR 129-1, which is indicated by CSR_ACCESS 490.

Figure 5:
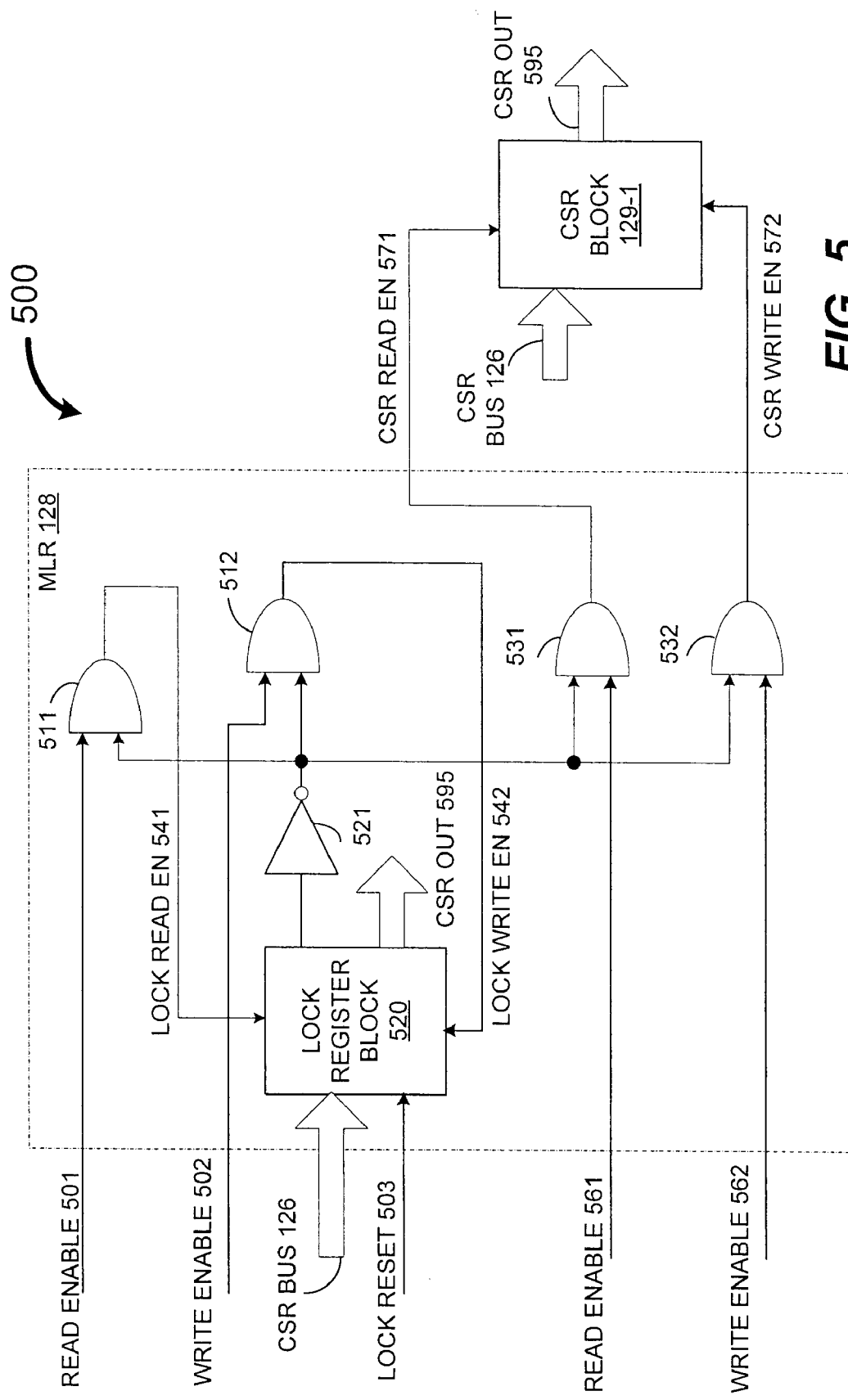
FIG. 5 illustrates protection logic that may used to protect private CSRs in accordance with at least one embodiment of the invention.

FIG. 5 illustrates protection logic 500 of the MLR 128 for protecting private CSR blocks according to one embodiment. In one embodiment, the protection logic 500 may comprise a lock register block 520, NOT logic gate 521, and AND logic gates 511, 512, 531, and 532.

In one embodiment, the output of the lock register block 520 may be provided as input to the NOT gate 521. In one embodiment, the output of the NOT gate 521 may be used to qualify the Read and Write enable signals 501, 502, 561, and 562 and may be provided as an input to AND logic gates 511, 512, 531, and 532. In one embodiment, the Read enable signals 501 and 561 may be provided as other input to the AND logic gates 511 and 531 to generate qualified read enable signals 541 and 571. In one embodiment, the Write enable signals 502 and 562 may be provided as the other input to the AND logic gates 512 and 532 to generate qualified Write enable signals 542 and 572. In one embodiment, the output of the AND logic gates 512 and 532 may be used to allow transfer of bits on the CSR bus 126 to the lock register block 520 and the CSR block 129-1 respectively. In one embodiment, the output of the AND logic gates 511 and 531 may be used to allow transfer of bits in the lock register block 520 and the CSR block 129-1 to the bus CSR OUT 595.

In one embodiment, the initial value of the lock register block 520 may be set to logic low using the LOCK reset signal 503. As a result, the output of the lock register block 520 may be logic low, which is provided as an input to the NOT logic gate 521. The output of the NOT logic gate 521 may thus be logic high, which may be provided as one of the input to the AND logic gates 511 and 512. In one embodiment, if either a Read enable 501 or a Write enable 502 of the lock register block 520 is high, the AND logic gates 511 and 512 may generate an output, which may be logic high. In one embodiment, the output of the AND logic gate 512 may be used to allow the lock register block 520 to transfer the data bits on the CSR bus 126-1 to the output. In one embodiment, the data bits stored in the lock register block 520 may be retrieved over the bus CSR OUT 595 if the LOCK Read enable 541 is logic high.

In one embodiment, the output of the NOT logic gate 521 may be provided as an input to the AND logic gate 532 and if one of the Read enable 561 or the Write enable 562 of the CSR block 129-1 is high, the output of the AND logic gate 532 may be logic high. In one embodiment, the output of the AND logic gate 532 may be used to allow the CSR block 129-1 to store the data bits provided on the CSR bus 126-1 if Write enable 562 is logic high. In one embodiment, the CSR bus end-point 127-1 may retrieve the contents of the CSR block 129-1 over the CSR OUT 595 if the Read enable 571 is logic high.

In one embodiment, after the transaction is complete, the configuration software may disable access to the protected CSR block 129-1 by setting logic high on one of the bits of the CSR bus 126, which is written into the lock register block 520. As a result, the output of the NOT gate 521 is logic low. In one embodiment, the disabling may cause the AND logic gates 511, 512, 531 and 532 to provide logic low signal as the output. As a result, logic low input may disable Read or Write operations to be performed on the lock register block 520 or the CSR block 129-1. In one embodiment, the output of the lock register block 520 may be sticky until the lock register block 520 is set to logic low using the LOCK RESET 503 signal. As a result, the access to the lock register block 520 and the CSR block 129-1 may be protected.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
    initiating a transaction in a first source agent of one or more source agents of a system having one or more target agents, the system having an interconnect fabric including a plurality of directory agents, wherein the one or more source agents and the one or more target agents are coupled to the interconnect fabric, and collectively comprise a plurality of heterogeneous agents,
    identifying a directory agent, of the plurality of directory agents, to process the transaction, in response to receiving the transaction in a parser of the interconnect fabric from the first source agent, wherein the parser identifies the directory agent using a table stored in the parser that associates the directory agents with the heterogeneous agents,
    identifying, in the directory agent, one of a target agent, of the one or more target agents, and a control and status register within the target agent using a first field of the transaction and a memory map stored in the directory agent to indicate mapping of a plurality of address ranges to identifiers of control and status registers of the plurality of heterogeneous agents,
    sending the transaction to the target agent based on identifying the target agent, and
    performing an operation indicated by a second field of the transaction on the control and status register of the target agent, wherein the plurality of directory agents in the interconnect fabric provide a directory based distributed control and status register access mechanism, each of the plurality of directory agents including the memory map.

2. The method of claim 1, wherein identifying the directory agent comprises,
    generating a first table comprising entries, wherein each entry associates each address range of the plurality of address ranges with at least one directory agent of the plurality of directory agents,
    comparing address bits of the first field of the transaction with the entries of the first table, and
    relating the transaction to the directory agent associated with a matching entry of the first table.

3. The method of claim 1, wherein identifying the directory agent comprises,
    generating a second table comprising entries, wherein each entry associates a sub set of the plurality of heterogeneous agents with at least one directory agent of the plurality of directory agents,
    comparing address bits of the first field of the transaction with the entries of the second table, and
    relating the transaction to the directory agent associated with a matching entry of the second table.

4. The method of claim 1, wherein determining the target agent comprises:
    comparing address bits of the first field of the transaction with the plurality of address ranges of the memory map,
    checking whether a match exists between the address bits of the first field and plurality of address ranges of the memory map, and
    identifying the control and status register of the target agent if a match exists.

5. The method of claim 1, further comprising:
    receiving transactions directed to the target agent from a set of source agents, and
    serializing the transactions to the target agent.

6. The method of claim 1, wherein performing the operation indicated by the second field of the transaction comprises:
    retrieving contents of a control and status register of the target agent if the transaction is a read transaction,
    storing control bits portion of the transaction to the control and status register of the target agent if the transaction is a write transaction,
    wherein the transaction is performed by a local control and status register access mechanism of the target agent, and
    protecting the control and status register of the target agent by disabling access to the control and status register by non-trusted source agents.

7. A system comprising:
    a source agent, wherein the source agent is to initiate a transaction,
    a target agent, wherein the target agent is to complete the transaction, and
    an interconnect fabric, wherein the interconnect fabric includes a plurality of directory agents, a controller, and a parser, wherein the source agent and the target agent are coupled to the interconnect fabric, the plurality of directory agents each including a memory map to indicate mapping of a plurality of address ranges to identifiers of control and status registers of a plurality of heterogeneous agents,
    wherein the controller is to generate the memory map,
    wherein the parser is to identify a directory agent, of the plurality of directory agents, in response to receiving the transaction from the source agent via a table stored in the parser that associates the directory agents with the heterogeneous agents,
    wherein the directory agent is to,
        process the transaction initiated by the source agent to identify the target agent and a control and status register within the target agent using a first field of the transaction to which the transaction is to be sent, and
        send the transaction to the target agent, and
    wherein the plurality of directory agents in the interconnect fabric provide a directory based distributed control and status register access mechanism.

8. The system of claim 7, wherein the controller is to,
    generate a first table comprising entries, wherein each entry associates each address range of the plurality of address ranges with at least one directory agent of the plurality of directory agents, and
    store the first table in the parser.

9. The system of claim 7, wherein the controller is to, generate a second table comprising entries, wherein each entry associates a sub set of the plurality of heterogeneous agents with at least one directory agent of the plurality of directory agents, and
store the second table in the parser.

10. The system of claim 9, wherein the parser is to
compare address bits of the first field of the transaction with the entries of the first table, and
relate the transaction to the directory agent associated with a matching entry of the first table.

11. The system of claim 9, wherein the parser is to,
check an identity of the source agent, and
identify the directory agent associated with the source agent by parsing entries in the second table.

12. The system of claim 7, wherein the directory agent is to:
compare address bits of the first field of the transaction with the plurality of address ranges of the memory map,
identify a matching address, and
identify a control and status register of the target agent based on the matching address.

13. The system of claim 7, wherein the directory agent is to:
receive transactions directed to the target agent from a set of heterogeneous agents of the plurality of heterogeneous agent, and
serialize the transactions to the target agent,
wherein the set of heterogeneous agent includes the source agent and the plurality of heterogeneous agents include the target agent.

14. The system of claim 7, wherein the target agent further comprises:
an interface to receive the transaction,
an access mechanism coupled to the interface, wherein the access mechanism is to generate a first signal if the transaction is a read transaction and a second signal if the transaction is a write signal, and
an end-point coupled to the access mechanism, wherein the end-point is to retrieve data from the control and status register in response to receiving the first signal and to store the data in the control and status register in response to receiving the second signal.

15. The system of claim 14, wherein the target agent further comprises a bus coupled to the access mechanism and the end-point, wherein the bus is to transfer the data between the control status register and the access mechanism.

16. The system of claim 14, wherein the end-point further comprises a protection logic, wherein the protection logic is to protect the control and status register of the target agent by preventing access to the control and status register by a non-trusted source.

17. The system of claim 16, wherein the protection logic comprises:
an enabling logic to control the access to the control and status register, and
a lock register coupled to the enabling logic,
wherein the lock register is to enable the enabling logic to allow access to the control and status register in response to receiving a reset signal,
wherein the lock register is to disable the enabling logic from allowing access to the control and status register in response to receiving a disable signal.

18. The system of claim 17, wherein the reset signal is initiated by the access mechanism and the disable signal is initiated by a trusted source agent after configuring the control and status register, and the trusted source agent comprises a trusted boot-loader, wherein the trusted boot-loader is to configure the control and status register before initiating the set signal.

19. A system comprising:
a source agent to initiate a transaction;
a target agent to complete the transaction, and including a control and status register mechanism coupled to a bus complex, at least one control and status register endpoint coupled to the bus complex and including a master lock register, and a control and status register coupled to the at least one control and status register endpoint; and
an interconnect fabric to couple the source agent and the target agent and including a controller, a parser, and a plurality of directory agents each including a memory map to indicate mapping of a plurality of address ranges to identifiers of control and status registers of a plurality of heterogeneous agents including the source agent and the target agent, wherein the parser is to identify a directory agent of the plurality of directory agents responsive to the transaction via a table stored in the parser that associates the directory agents with the heterogeneous agents, and wherein the identified directory agent is to process the transaction to identify the target agent and the control and status register using a first field of the transaction and send the transaction to the target agent, and wherein the plurality of directory agents in the interconnect fabric provide a directory based distributed control and status register access mechanism.

20. The system of claim 19, wherein the control and status register endpoint further comprises a protection logic to protect the control and status register of the target agent by preventing access to the control and status register by a non-trusted source.

21. The system of claim 19, wherein the protection logic comprises:
an enabling logic to control the access to the control and status register, and
a lock register coupled to the enabling logic to enable the enabling logic to allow access to the control and status register in response to receiving a reset signal, and disable the enabling logic from allowing access to the control and status register in response to receiving a disable signal.

22. The system of claim 21, wherein the reset signal is initiated by the access mechanism and the disable signal is initiated by a trusted source agent after configuration of the control and status register, the trusted source agent comprising a trusted boot-loader, wherein the trusted boot-loader is to configure the control and status register before initiating the set signal.

* * * * *